Jan. 9, 1951    R. C. BALLARD    2,537,569
TIME INTERVAL INDICATING SYSTEM
Filed Feb. 15, 1947    2 Sheets—Sheet 1

Inventor
Randall C. Ballard
By C. D. Puska
Attorney

Inventor
*Randall C. Ballard*

Patented Jan. 9, 1951

2,537,569

UNITED STATES PATENT OFFICE 2,537,569

TIME INTERVAL INDICATING SYSTEM

Randall C. Ballard, Trenton, N. J., assignor to Radio Corporation of America, a corporation of Delaware Application February 15, 1947, Serial No. 728,861

2 Claims. (Cl. 175—381)

My invention relates to the measurement of the time interval between successive electrical pulses. It will be described particularly with respect to a pulse-echo radar system wherein a servo shaft assumes an angular position that is a function of the distance to a pulse reflecting object.

An object of the invention is to provide an improved and simplified circuit for measuring the time interval between successive electrical pulses.

A further object of the invention is to provide an improved distance indicating apparatus for a pulse-echo radar system.

A still further object of the invention is to provide an improved pulse-echo distance measuring system wherein a servo shaft assumes an angular position that is a function of the distance being measured.

A still further object of the invention is to provide an improved means for measuring the time interval between the starts of two successive pulses even though the two pulses overlap.

According to a preferred embodiment of the present invention two vacuum tubes are connected with the anode-cathode impedance of one tube in the cathode circuit of the other tube so that said other tube acts as a cathode follower tube. The junction point of the cathode of the cathode follower tube and the anode of the other tube has a connection to ground only through a small amount of capacity which preferably is only distributed capacity. The first of the two pulses is applied with positive polarity to the grid of the cathode follower tube whereby its cathode goes above ground due to cathode follower action and is held there by said distributed capacity. The next pulse is applied with positive polarity to the grid of the other tube whereby the said cathode is brought back to a lower potential.

As a result of the above action there is produced at said junction point a positive pulse having a duration that is equal to the time interval between the two applied pulses. In the present example, this pulse is applied to a sawtooth producing circuit that produces a sawtooth having a peak amplitude that is a function of said pulse duration.

The sawtooth waves thus produced are supplied to a servo system in which a motor shaft is caused to assume an angular position that is a function of the peak amplitude of said sawtooth waves and, therefore, a function of said time interval between pulses.

Figure 1:
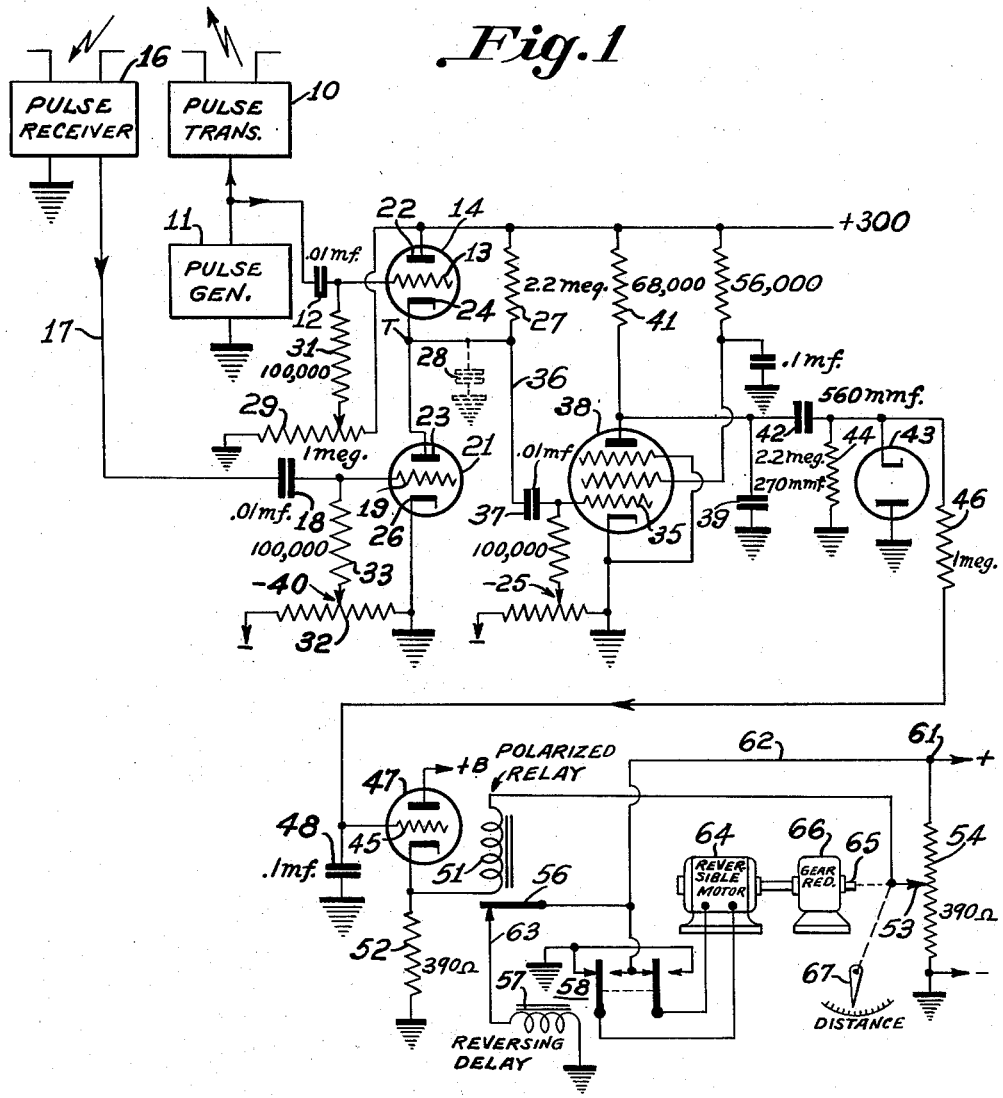
Figure 2:
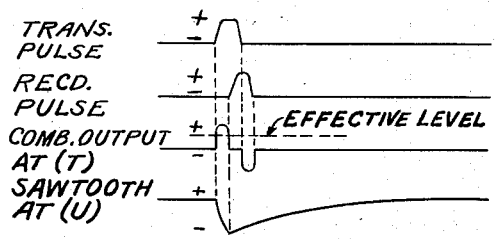
Figure 3:
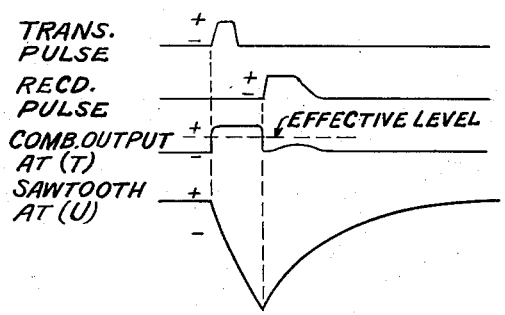
Figure 4:
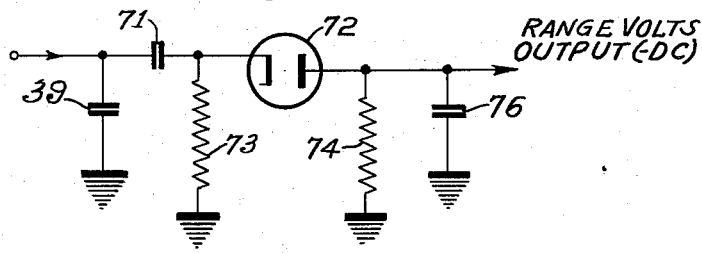

The invention will be better understood from the following description taken in connection with the accompanying drawing in which, Figure 1 is a block and circuit diagram of a radar system embodying my invention, Figures 2 and 3 are groups of graphs that are referred to in explaining the operation of the invention, and Figure 4 is a circuit diagram showing a modification of a portion of the circuit shown in Figure 1.

In the several figures similar parts are indicated by similar reference characters.

Figure 1 shows a radar system of the pulse-echo type comprising a pulse transmitter 10 that is modulated by pulses supplied from a pulse generator 11. Simultaneously with the pulse transmission, pulses are supplied from the pulse generator 11 through a blocking condenser 12 to the grid 13 of a vacuum tube 14. In the present example the pulse repetition rate is 5000 pulses per second.

The transmitted pulses are received after reflection by a pulse receiver 16 and supplied over a conductor 17 and through a blocking capacitor 18 to the grid 19 of a vacuum tube 21.

The vacuum tube 14, which acts as a cathode follower tube, has the operating voltage applied directly to its anode 22 and has the anode-cathode impedance of the tube 21 connected in its cathode circuit, the anode 23 of tube 21 being connected directly to the cathode 24 of the tube 14 and the cathode 26 of the tube 21 being connected to ground.

Operating voltage is applied to the anode 23 of tube 21 through a resistor 27 of high impedance. The distributed capacity between the cathode 24 and ground is indicated at 28. The capacity 28 may be of the order of five or ten micro-microfarads and serves to hold the cathode 24 at the potential above ground to which it is driven when a pulse appears on the grid 13.

The grid 13 of tube 14 has a slightly positive bias potential applied to it from potentiometer resistor 29 by way of a grid resistor 31. The grid 19 of the tube 21 has a negative bias applied to it from a bias resistor 32 by way of a grid resistor 33, this bias voltage being sufficient to bias the tube 21 to cut-off.

The operation by which pulses appear on the cathode 24 or junction point T having a duration equal to the interval between transmission of a pulse and reception of the pulse after reflection will be better understood by referring to Figs. 2 and 3. In Figure 2 there is illustrated the condition where the time interval is shorter than the duration of a transmitted pulse whereby the transmitted and received pulses overlap. As soon as the transmitter modulating pulse of positive polarity appears on the grid 13, the junction point T goes positive as indicated by the graph marked "combined output," this being the result of the cathode 24 following the grid potential due to the cathode follower action. As soon as the positive received pulse appears on the grid 19 of tube 21, the tube 21 becomes conducting and brings the point T back substantially to ground potential. Thus, a positive pulse appears at T having a duration equal to the time interval between the front edges of the two applied pulses.

Referring to Figure 3, the same action takes place but in this instance the applied pulses do not overlap. The function of the distributed capacity 28 is evident here as it will be noted that the positive pulse of the "combined output" at T maintains its voltage level after the termination of the transmitted pulse. Upon the reception of the reflected pulse, the resulting low impedance of the tube 21 brings the point T back substantially to ground potential. As before, the width of the positive pulse at point T is a measure of the time interval between the front edges of the two applied pulses.

The pulses taken off the point T may be utilized in various ways for producing an indication of distance to the reflecting object. In the system of Fig. 1 they are applied through a lead 36 and a blocking capacitor 37 to the control grid 35 of a pentode 38 which functions as the discharge tube of a sawtooth wave producing circuit. A capacitor 39 across which a sawtooth voltage is to be produced is connected between ground and the anode of the pentode 38. Positive D.-C. voltage is applied to capacitor 39 through the plate resistor 41 of the pentode 38.

The pentode 38 is biased beyond cut-off and the capacitor 39 charges to full plus B potential between successive pulses taken from the point T. Each time a positive pulse from the point T is applied to the grid 35 of the discharge tube, the capacitor 39 partially discharges through the tube 38. The amount of this discharge depends upon the duration of the applied pulse. Therefore, the amplitude of the resulting sawtooth wave produced across capacitor 39 is a function of the duration of the pulse supplied from point T. This is illustrated by the graphs in Figs. 2 and 3.

Preferably, the amplitude of the pulse from the point T is sufficient to drive the grid 35 of the pentode 38 positive so as to make it draw grid current. This effectively clips the pulse at the grid 35 so that any variations in the pulse amplitude above a certain voltage level, indicated as the "effective level" in Figs. 2 and 3, will not affect the discharge rate of the sawtooth capacitor 39.

The sawtooth waves from capacitor 39 are applied through a capacitor 42 to the cathode of a diode 43. A resistor 44 is connected across the cathode and anode of the diode 43, the anode of the diode 43 being grounded. The resulting rectified current which is of positive polarity, is applied through a filter resistor 46 to the grid 45 of a cathode follower tube 47. A filter capacitor 48 is connected between the grid 45 and ground.

The coil 51 of a polarized relay is connected between the cathode end of the cathode resistor 52 and a variable tap 53 on a voltage divider 54. It will be apparent that the armature 56 of the polarized relay either opens or closes a circuit through the coil 57 of a reversing relay 58 depending upon whether the cathode of tube 47 is above or below the potential of the tap 53. The energizing circuit for the coil 57 is from a positive voltage terminal 61 through a lead 62, the armature 56, and through a lead 63 to the coil 57.

The tap 53 is driven along the resistor 54 in one direction or the other by a reversible servo-motor 64 through reduction gears 66. A pointer 67 coupled to the gear reduction shaft 65 indicates distance.

The motor 64 is connected to a power supply source through the reversing switch of relay 58. When the relay 58 is energized the motor 64 drives the tap 53 in one direction; when the relay 58 is deenergized the motor 64 drives the tap 53 in the other direction.

It will be evident from the foregoing description that the tap 53 is driven to a point on resistor 54 where the voltage is substantially equal to the voltage at the cathode of the cathode follower tube 47. Therefore, the angular position of the servo shaft 65 is a function of the voltage level of the signal supplied to the tube 47, which, in turn, is a function of the time interval between successive pulses applied to the tubes 14 and 21.

In Figure 1 various circuit values have been indicated in ohms, megohms, microfarads and micro-microfarads, merely by way of example. Likewise certain voltages have been indicated merely by way of example.

Figure 4 shows a rectifier-filter arrangement that may be used in place of the one illustrated in Fig. 1 for converting the sawtooth wave into a D.-C. voltage. In this arrangement the voltage output is negative instead of positive as in Fig. 1 and may be desirable for some servo relay circuits. The sawtooth voltage from capacitor 39 is applied through a capacitor 71 to the cathode of a diode 72. Resistors 73 and 74 are connected from the cathode and the anode, respectively, of the diode 72 to ground, and a filter capacitor 76 is connected across the resistor 74.

In the claims the term "vacuum tube" means a high vacuum tube of the usual type as distinguished from a gas or vapor filled tube.

I claim as my invention:

1. In a system for measuring the time interval between the front edges of successive electrical pulses, a cathode-follower vacuum tube having an anode, a cathode and a control grid, a second vacuum tube having an anode, a cathode and a control grid, said last tube having its anode connected directly to the cathode of the cathode-follower tube and having its cathode connected to ground whereby said last tube functions as the cathode impedance of the cathode-follower tube, means for applying operating voltage to the anode of the cathode-follower tube, a high impedance element, means for applying operating voltage to the anode of the second tube through said high impedance element, means for taking an output signal off the junction point of the cathode of the cathode-follower tube and the anode of the second tube, there being a certain amount of distributed capacity between said junction point and ground, means for maintaining said second tube normally biased to plate current cut-off, means for applying the first of said pulses to the grid of the cathode-follower tube with positive polarity whereby the cathode of said cathode-follower tube rises to a more positive potential and whereby said distributed capacity is charged to said increased cathode potential, and means for applying the next succeeding pulse to the grid of the second tube with positive polarity whereby the cathode of said cathode-follower tube is brought back substantially to ground potential.

2. A time interval measuring system for use in a pulse-echo radar system comprising means for transmitting radio pulses and means for receiving said pulses after reflection from an object at a distance to be determined, said measuring system comprising a cathode-follower vacuum tube having an anode, a cathode and a control grid, a second vacuum tube having an anode, a cathode and a control grid, said last tube having its anode connected directly to the cathode of the cathode-follower tube and having its cathode connected to ground whereby said last tube functions as the cathode impedance of the cathode-follower tube, means for applying operating voltage to the anode of the cathode-follower tube, a high impedance element means for applying operating voltage to the anode of the second tube through said high impedance element, means for taking an output signal off the junction point of the cathode of the cathode-follower tube and the anode of the second tube, there being a certain amount of distributed capacity between said junction point and ground, means for maintaining said second tube normally biased substantially to plate current cut-off, means for applying a positive pulse to the grid of the cathode-follower tube at the instant of pulse transmission whereby the cathode of said cathode-follower tube rises to a more positive potential and whereby said distributed capacity is charged to said increased cathode potential, and means for applying the reflected pulse with positive polarity to the grid of the second tube whereby the cathode of said cathode-follower tube is brought back substantially to ground potential.

RANDALL C. BALLARD.

REFERENCES CITED

The following references are of record in the file of this patent:

UNITED STATES PATENTS

| Number | Name | Date |
| --- | --- | --- |
| 1,809,683 | Fitzgerald | June 9, 1931 |
| 2,026,421 | Fecker | Dec. 31, 1935 |
| 2,250,708 | Herz | July 29, 1941 |
| 2,422,074 | Bond | June 10, 1947 |
| 2,433,667 | Hollingsworth | Dec. 30, 1947 |